(12) United States Patent
Chamayou et al.

(10) Patent No.: US 7,807,761 B2
(45) Date of Patent: Oct. 5, 2010

(54) APPARATUS AND PROCESS FOR THE WITHDRAWAL OF POLYMER FROM A GAS-PHASE POLYMERIZATION REACTOR

(75) Inventors: Jen-Louis Chamayou, Carry le Rouet (FR); Peter John Elstner, London (GB)

(73) Assignee: Ineos Europe Limited, Hampshire (GB)

( * ) Notice: Subject to any disclaimer, the term of this patent is extended or adjusted under 35 U.S.C. 154(b) by 455 days.

(21) Appl. No.: 11/883,048

(22) PCT Filed: Jan. 6, 2006

(86) PCT No.: PCT/GB2006/000031

§ 371 (c)(1),
(2), (4) Date: Jul. 26, 2007

(87) PCT Pub. No.: WO2006/079774

PCT Pub. Date: Aug. 3, 2006

(65) Prior Publication Data

US 2008/0166272 A1    Jul. 10, 2008

(30) Foreign Application Priority Data

Jan. 26, 2005   (EP) .................................. 05250379

(51) Int. Cl.
*C08F 2/00* (2006.01)
*B01J 8/18* (2006.01)
*B01J 19/00* (2006.01)
*F27B 15/08* (2006.01)

(52) U.S. Cl. ............... 526/88; 526/65; 526/67; 422/131; 422/135; 422/139; 422/141; 422/142; 422/143; 422/144; 422/145; 422/146; 422/147

(58) Field of Classification Search ................ 422/131, 422/135, 139, 141–147; 526/65, 67, 88
See application file for complete search history.

(56) References Cited

U.S. PATENT DOCUMENTS

| 2,651,565 | A | * | 9/1953 | Bergman | ..................... 422/143 |
| 4,877,587 | A | * | 10/1989 | Rhee et al. | ..................... 422/135 |
| 5,041,473 | A | * | 8/1991 | Gau et al. | ..................... 523/330 |
| 5,545,378 | A | | 8/1996 | Morterol et al. | |

(Continued)

FOREIGN PATENT DOCUMENTS

| EP | 0 728 771 A1 | 8/1996 |
| EP | 0 728 772 A1 | 8/1996 |
| EP | 0 830 892 A1 | 3/1998 |
| WO | WO 00/29452 | 5/2000 |
| WO | WO 03/011920 A1 | 2/2003 |

*Primary Examiner*—Walter D Griffin
*Assistant Examiner*—Huy-Tram Nguyen
(74) *Attorney, Agent, or Firm*—Nixon & Vanderhye

(57) ABSTRACT

Process and apparatus for gas-phase polymerization of olefin(s), including a fluid or stirred bed reactor, a bed level controller, and at least one conduit for withdrawing polymer, provided with an isolation valve. The conduit connects the side wall of the reactor to at least one uplift conduit, at least one recovery gas lock hopper equipped with a discharge valve, and at least one degassing chamber. At least one flushing device is provided for flushing the at least one uplift conduit.

8 Claims, 3 Drawing Sheets

U.S. PATENT DOCUMENTS

| | | |
|---|---|---|
| 5,798,309 A | 8/1998 | Breuers et al. |
| 5,929,180 A * | 7/1999 | Chinh ........................ 526/68 |
| 6,056,927 A * | 5/2000 | Chinh et al. ................ 422/139 |
| 6,255,411 B1 | 7/2001 | Hartley et al. |
| 6,498,220 B2 | 12/2002 | Hartley et al. |
| 2002/0198335 A1 * | 12/2002 | Bernier et al. ................ 526/88 |
| 2004/0213706 A1 * | 10/2004 | Kivela et al. ................ 422/139 |
| 2005/0152816 A1 * | 7/2005 | Kivela et al. ................ 422/139 |

* cited by examiner

APPARATUS AND PROCESS FOR THE WITHDRAWAL OF POLYMER FROM A GAS-PHASE POLYMERIZATION REACTOR

This application is the U.S. National Phase of International Application PCT/GB2006/000031, filed 6 Jan. 2006, which designated the U.S. PCT/GB2006/000031 claims priority to European Application No. 05250379.4 filed 26 Jan. 2005. The entire content of these applications are incorporated herein by reference.

The present invention relates to both equipment and to a process for gas-phase polymerization of olefin(s) in a fluidized and optionally mechanically stirred bed, particularly with devices for improving the withdrawal of the manufactured polymer.

In particular, the present invention relates to equipment and a process by which polymer can be withdrawn from a polymerization reactor and passed to degassing step without use of a physical conveying system.

SUMMARY OF THE INVENTION

Thus, in a first embodiment, the present invention provides equipment for the gas-phase polymerization of olefin(s), including a reactor with a fluidized or mechanically stirred bed and with a vertical side wall, provided at its base with a fluidization grid, the vertical side wall of the reactor extending a height H above the fluidization grid, a conduit for external circulation of a reaction gas mixture, connecting the top of the reactor to the base of the reactor under the fluidization grid and including a compressor and at least one piece of equipment for heat removal, a bed level controller, and at least one withdrawal conduit for withdrawing polymer, at least one uplift conduit, at least one recovery gas lock hopper equipped with a discharge valve, and at least one degassing chamber, the equipment being characterized in that (i) the at least one withdrawal conduit connects the reactor to the at least one recovery gas lock hopper, the at least one withdrawal conduit has an isolation valve prior to the recovery gas lock hopper and the at least one withdrawal conduit leaves the side wall of the reactor at a height of the reactor wall above the fluidization grid ranging from 0H to 0.15H, whilst being directed in a downwards fashion at an angle A with the horizontal plane ranging from 20 to 75 degrees below the horizontal plane, and said withdrawal conduit having an internal diameter of between 5.0 and 20.5 cm, (ii) the recovery gas lock hopper has a volume of at least 200 liters, and (iii) the at least one uplift conduit is connected between the recovery gas lock hopper and an inlet of the degassing chamber and has a vertical height of at least 20 m and an internal diameter of between 5.0 and 20.5 cm, and provides transport in an upwards direction in the direction of flow between the reactor and the inlet of the degassing chamber.

This withdrawal of polymer from a polymerization reactor and transport to the degassing step without use of a physical conveying system is achieved by provision of equipment of defined dimensions that allows the pressure differential between the reactor and the degasser to be used to enable the transport of the polymer.

It is necessary according to the process of the present invention to withdraw the polymer from a lower part of a polymerization reactor. By withdrawal at a low level, agglomerates in the reactor are removed before they become too large, minimising the chance of the agglomerates blocking the conduits connecting the reactor to the lock hopper (and subsequently to the degasser), which would prevent the required transport.

The inlet of the at least one degassing chamber is disposed at a vertical height above the vertical height at which the withdrawal conduit leaves the side wall of the reactor. Thus, the polymer removed from the reactor has to be transported in an overall upwards direction to the top (inlet) of the degasser.

The downward direction of withdrawal of the withdrawal conduit enables polymer to be withdrawn from the reactor with a reduced amount of gas. However, whilst it is still generally desired to reduce the gas to polymer ratio in the lock hopper, in the present invention enough gas pressure is required to effect subsequent uplift whilst maintaining overall production rates.

To give this required uplift without a physical conveying system requires an uplift conduit of defined dimensions and a lock hopper of sufficient size, such that the pressure, in the lock hopper (which is derived from the pressure in the reactor) may be used to effect the uplift.

Two configurations of the present invention are shown in FIGS. 1 and 2. The uplift conduit is a vertical conduit running parallel to the vertical wall of the reactor which transports the polymer powder in an upwards direction (in the direction of flow between the reactor and the inlet of the degassing chamber). The term 'vertical' or 'vertically' used in the present description is understood to mean any plane or any direction which is vertical to within more or less five degrees, preferably three degrees. The uplift conduit usually has a vertical height ranging from 20 to 80 m.

The uplift conduits have an internal diameter that is above 5.0 cm and below 20.5 cm, preferably above 6.0 cm and below 10.5 cm, and in particular above 6.0 cm and below 8.0 cm. The diameter used generally depends on the flow rates of powder to be withdrawn from the reactor and is therefore variable between different systems.

The uplift conduit is a connecting means used to transport the polymer powder and gas from the gas lock hopper into the degassing chamber. The force required to transport the powder from the reactor through the uplift conduit to the combined degassing chamber occurs through the difference in pressure between the gas lock hopper and the degassing chamber.

The equipment of the present invention includes a bed level controller for control of the withdrawal of polymer, which resets the withdrawal rate for the withdrawal conduit in order to maintain the reactor bed level at a constant height. The withdrawal conduit is directed downwards from the vertical side wall of the reactor at an angle A either below the horizontal plane of more than 20 degrees and less than 75 degrees, preferably more than 35 degrees and less than 65 degrees and in particular more than 45 degrees and less than 50 degrees. This withdrawal conduit should not comprise any horizontal portion nor any slightly inclined portion forming with a horizontal plane an angle that is, for example, smaller than 20 degrees.

The angles of withdrawal according to the present invention are based on the angle of repose of the polymer to be withdrawn. The angle of repose, β, of the polymer is that defined by F. A. Zenz and D. F. Othmer in "Fluidization and Fluid-Particle Systems" published in "Reinhold Chemical Engineering Series" by Reinhold Publishing Corporation, New York, (1960), pages 85 to 88. It is also called "angle of repose alpha" by the Federation Europeenne de la Manutention [European Handling Federation], Section II, "Continuous Handling/Special Characteristics of Bulk Products Transported in Pneumatic Conveyors" (FEM 2, 481), GB edition 1984, pages 9 and 10, and FIG. 2.

The angle of repose, beta, of the polymers manufactured according to the present invention, in particular of powders of polyethylene, of polypropylene or of a copolymer of ethylene or of propylene, can generally have a value higher than 30 degrees and lower than 60 degrees, preferably higher than 35 degrees and lower than 55 degrees and in particular 40 to 45 degrees.

According to a preferred embodiment of the present invention the at least one withdrawal conduit leaves the side wall of the reactor at a height of the reactor wall above the fluidization grid ranging from above 0H to 0.05H, more preferably above 0.02H and below 0.05H. This range of withdrawal is so that the agglomerates formed in the reactor are withdrawn before they are large enough to cause a blockage further along the system.

Suitably the fluidized bed may occupy the whole of the reactor with a vertical side wall. Preferably, the reactor is cylindrical.

According to an embodiment of the present invention the withdrawal conduit may consist of a single rectilinear conduit, or of a joined succession of two or a number of rectilinear conduits, it being possible for the joined part(s) between two rectilinear conduits to be one or more portions of a curved conduit, such as is shown in EP0830892.

The withdrawal conduits have an internal diameter that is above 5.0 cm and below 20.5 cm, preferably above 6.0 cm and below 10.5 cm, and in particular above 6.0 cm and below 8 cm. The diameter used generally depends on the flow rates of powder to be withdrawn from the reactor and is therefore variable between different systems. The increase in the internal diameter allows more of the product to flow through the conduit and helps prevent agglomerate blockages.

According to an embodiment of the present invention the internal volume of the withdrawal conduit, that is the conduit between the reactor and the gas lock hopper ranges from $\frac{1}{2}$ and $\frac{1}{500}$, preferably between $\frac{1}{5}$ and $\frac{1}{200}$, in particular between $\frac{1}{10}$ and $\frac{1}{100}$ the internal volume of the recovery gas lock hopper.

BRIEF DESCRIPTION OF THE DRAWINGS

The present invention will now be described with respect to FIGS. 1 to 3, wherein.

DETAILED DESCRIPTION OF PREFERRED EMBODIMENTS

Figure 1:
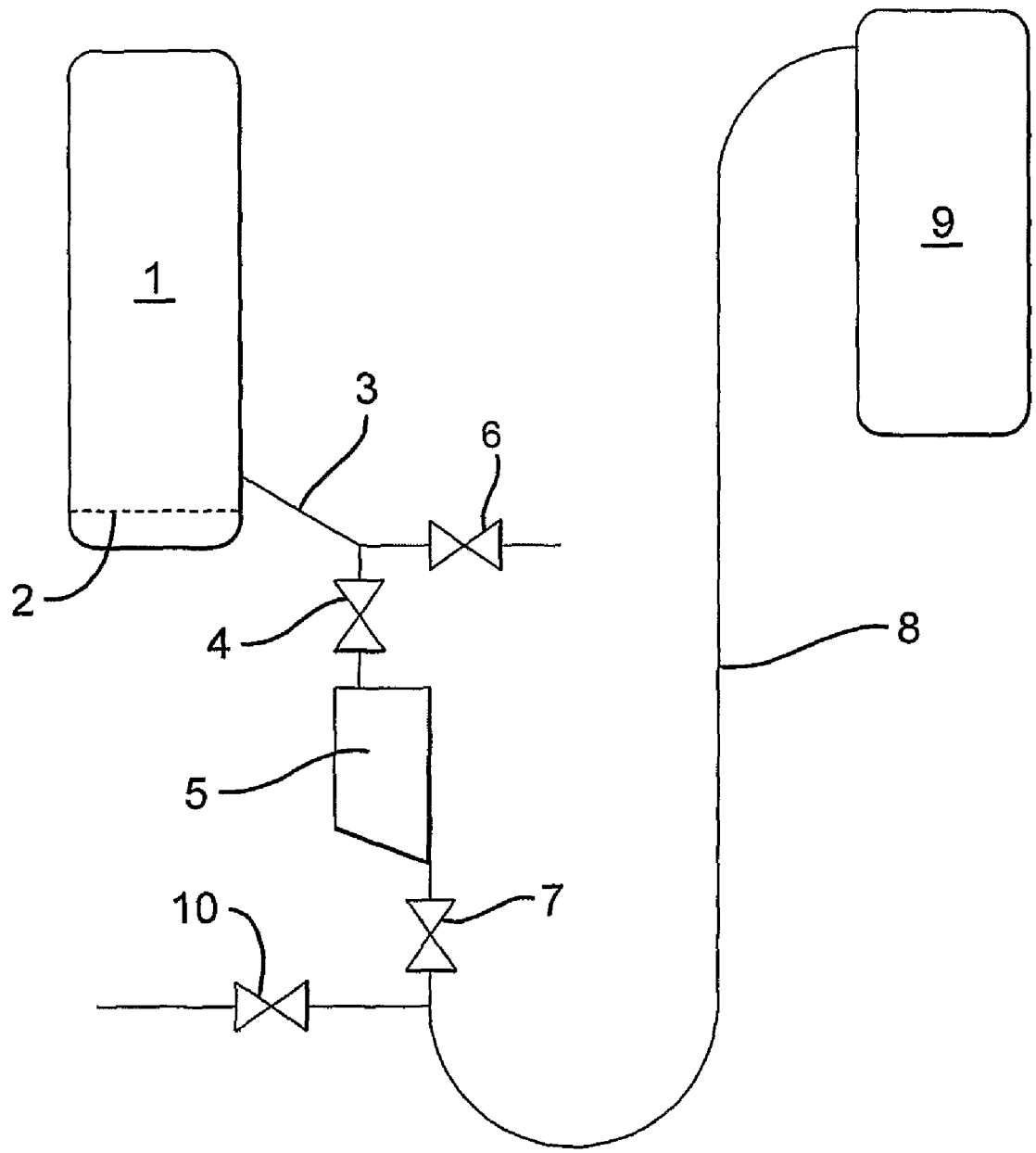
FIGS. 1 and 2 represent diagrammatically two configurations of the present invention.

In particular, FIG. 1 shows diagrammatically an illustration of the equipment for gas-phase polymerization of olefin(s) comprising of a fluidized bed reactor (1) with a fluidisation grid (2) near the base. The equipment comprises a withdrawal conduit (3) for withdrawing polymer, provided with an isolation valve (4), and connecting the side wall of the reactor to a recovery gas lock hopper (5) with means for flushing of the valve (6). At the base of the lock hopper (5) is a discharge valve (7), and the lock hopper is then connected to a vertical uplift conduit (8) connecting said gas lock hopper (5) to a combined degassing chamber (9) with an uplift of between 20 and 80 m. A means for flushing the uplift conduit (10) is also provided.

Figure 2:
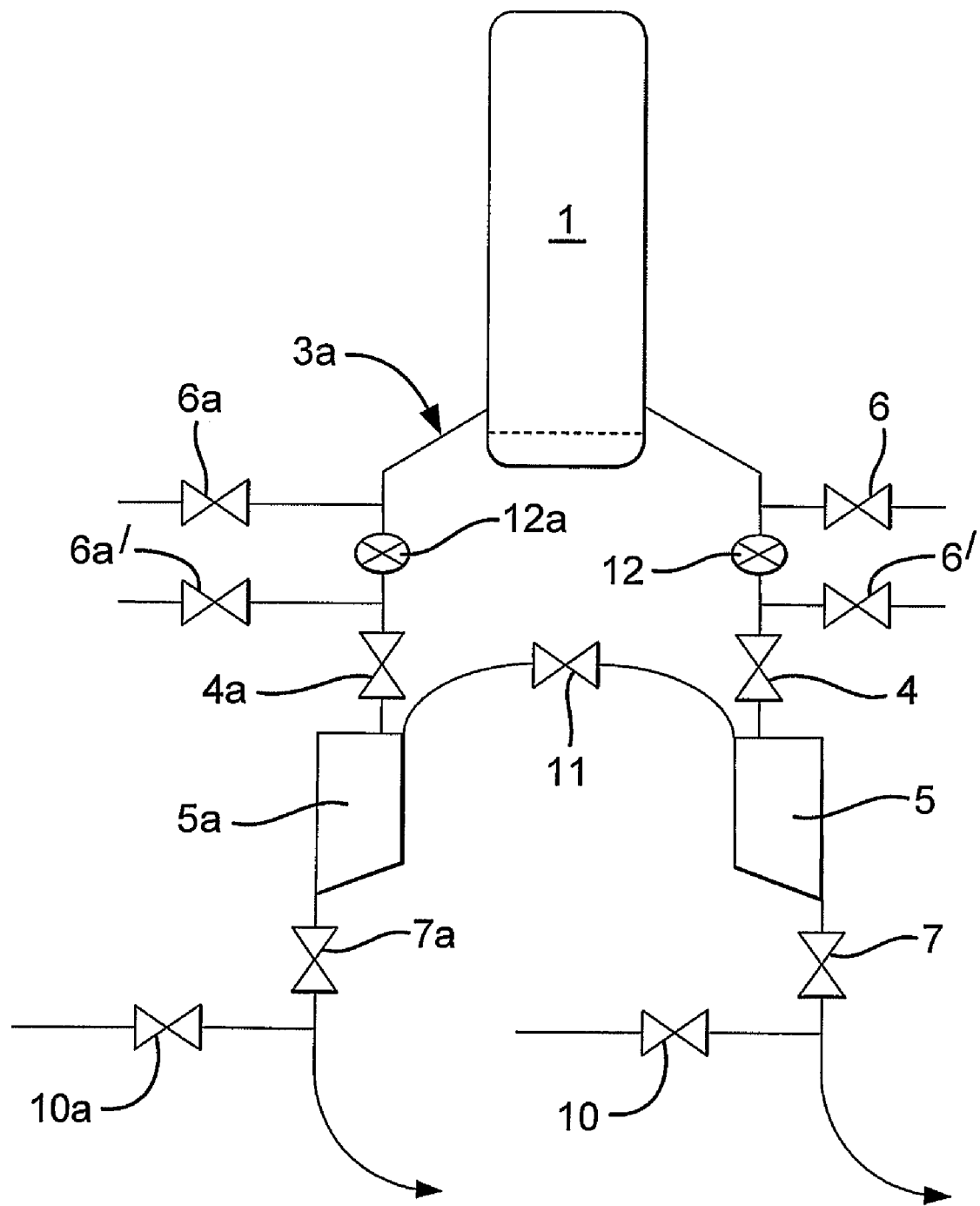

FIG. 2 shows diagrammatically an illustration of a preferred and improved alternative form of FIG. 1, comprising of an additional withdrawal conduit (3a) leading to an additional gas recovery hopper (5a), which is connected in parallel to the gas recovery hopper (5) shown in FIG. 1 by a pressure equalizer conduit equipped with an interconnection valve (11), in order to reduce the amount of gas present.

Furthermore FIG. 2 includes additional devices, in particular a delumper (12, 12a) that is connected to the reactor (1) by the withdrawal conduit (3, 3a) and separated from the gas lock hopper (5, 5a) by an isolation valve (4, 4a) with flushing means (6', 6a'), and is used to crush the polymer withdrawn from the reactor. The delumper(s) may alternatively be before the lock hopper (5, 5a) but downstream of the isolation valve (4, 4a) or downstream of the lock hopper (5, 5a) but upstream of the discharge valves (7, 7a).

Figure 3:
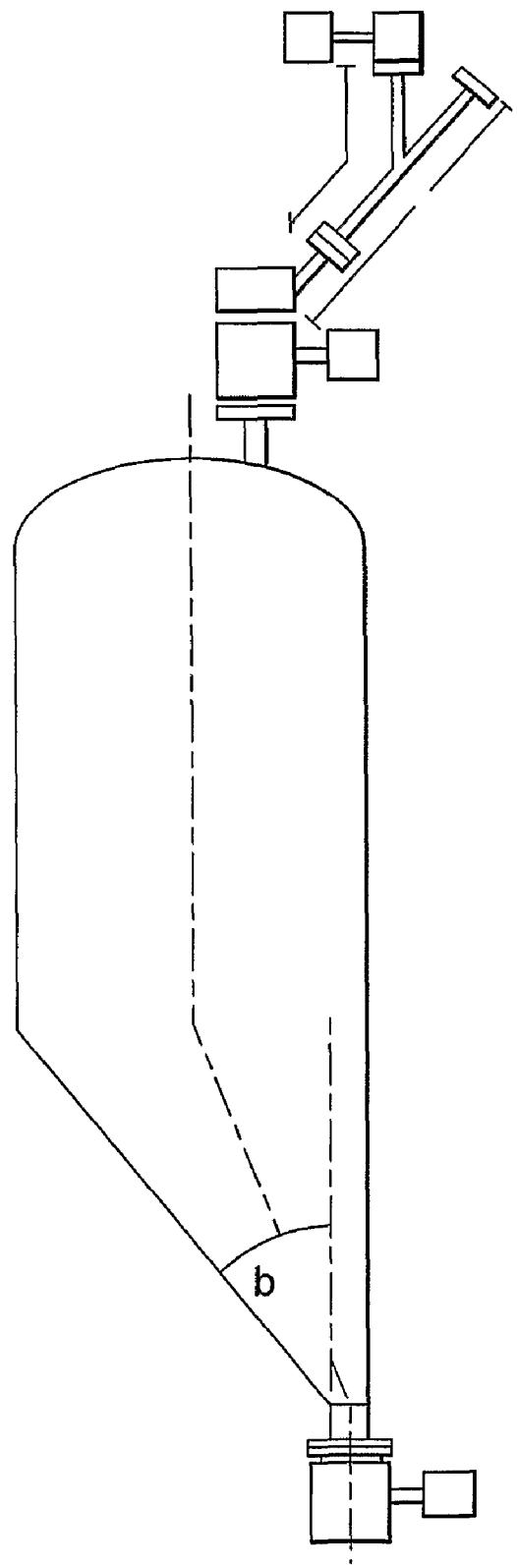
FIG. 3 represents diagrammatically a preferred form of the lock hopper.

FIG. 3 diagrammatically illustrates a preferred embodiment of a gas lock hopper according to the present invention, applicable to configurations 1 and 2. FIG. 3 is a longitudinal section view across a vertical plane of a gas lock hopper. This design improves the flowability of the powder through the hopper and can be obtained by an asymmetric design of the internal volume. The gas lock hopper design consists of a vertical cylinder attached to a vertical oblique truncated cone, of which one wall is vertical, preferably in continuity with a wall of the vertical cylinder (shown as the right wall in FIG. 3). The oblique truncated tube corresponds to the vertical cylinder at the widest part and the narrower base corresponds to the discharge orifice. The withdrawal conduit and hence the powder emerges at the top of said gas lock hopper near the opposite wall to the eventual discharge. Thus, in FIG. 3, the withdrawal conduit and hence the powder emerges at the top of said gas lock hopper near the left wall of the gas lock hopper and is discharged at the bottom of said gas lock hopper near the right wall of the oblique truncated cone. The angle b, formed at the base of the truncated cone is usually above 20 degrees and below 40 degrees (to the vertical), preferably between 28 and 32 degrees, usually determined according to the angle of repose, β.

According to a preferred embodiment of the present invention the recovery gas lock hopper(s) is preferably a closed vessel with a specified shape as illustrated in FIG. 3 into which the withdrawal conduit emerges in its upper part, preferably at its top. In particular, it includes in its lower part, preferably in its lowest part, an opening provided with a discharge valve communicating with a degassing chamber through the intermediary of a connecting conduit (uplift conduit). The internal volume of the recovery gas lock hopper is above 200 LITERS and usually below 1000 LITERS, preferably below 550 LITERS. This volume provides enough gas pressure to push the polymer through the uplift conduit to the degasser.

The internal wall of the lock hopper usually consists of steel and has a smooth internal finish, that is during manufacture care is taken to ensure nothing will protrude or disrupt the powder flow.

The specified shape and design of the lock hopper as illustrated in FIG. 3 allows for improved powder flowability and for the prevention of 'arching' and 'fatigue' thus improving the conveying time for product withdrawal.

According to a preferred embodiment of the present invention there are at least two withdrawal conduits exiting the reactor and subsequently at least two gas lock hoppers as shown in FIG. 2.

According to a preferred embodiment the gas lock hopper(s) are interconnected by a pressure equalizer conduit which is equipped with an interconnection valve, as shown in FIG. 2, thus reducing the amount of gas present. The degassing method for the preferred embodiment shown diagrammatically in FIG. 2, featuring interconnecting hoppers, operates as follows:

a) Valves 4 and 7a are opened and valves 4a, 7 and 11 are all closed; hence the gas lock hopper 5 is connected directly to the reactor and at least a portion of the polymer and the fluidizing gas from the reactor enters into gas lock hopper 5, having a pressure less than the operating pressure of the reactor. Hopper 5a is isolated from hopper 5 and the reactor and has a pressure equal to that of the degasser ranging from 0.02 to 1 barg;

b) Valve 4 is then closed and valve 11 is opened and a portion of the gas is transferred from hopper 5 through a connection to hopper 5a in a way that minimises the transfer of any of the powder in hopper 5; hopper 5a having a lower pressure than hopper 5;

c) Valve 11 is then closed and hopper 5a is ready for a withdrawal as described in a) above for hopper 5. Simultaneously to this, valve 7 is opened and the mixture residing in gas lock hopper 5 is transported downstream to the degassing vessel and optionally through an 'uplift' conduit (not shown). Optionally, valve 11 may be opened again to further balance the two lockhoppers 5 and 5a pressures after lockhopper 5 has discharged its mixture of gas and powder to the degassing vessel;

d) In the next withdrawal from the reactor steps a), b) and c) are then repeated, except primarily using hopper 5a as the collecting vessel and using hopper 5 as a means of recovering the gas.

According to a preferred embodiment of the present invention a delumper is featured as shown diagrammatically in FIG. 2 and can either be situated upstream or downstream in relation to the gas lock hopper, with a preference to upstream, and is a means of crushing the polymer along with the agglomerates so as to remove any oversized agglomerates from the product before entering into the degassing chamber thus avoiding any operational difficulties. The delumper is preferably accompanied with an intrinsically safe speed detection system to provide instantaneous feedback on unit rotational status and a proprietary high profile cutter design for optimized feeding and effective particle reduction with little heat rise or headloss. The delumper unit connects to the conduits via standard flanges directly in pressurized, fully enclosed systems like an ordinary valve. The delumper reduces agglomerates and solids, protects downstream equipments and improves flow properties.

According to a preferred embodiment of the present invention after the transfer of the powder from the reactor to the degassing chamber, gas assistance may be provided at a higher pressure than in the transport conduits by means of a flush of conveying gas released at valves 6 and 10 in the system as shown in FIG. 1 and additionally and preferably at valves 6a, 6', 6a' and 10a as illustrated in FIG. 2. This action may be performed as it is not desirable to keep the conduits filled with powder for long periods of time as this promotes blockages. The time taken for the purge of gas is variable and is adjusted to provide the correct withdrawal cycle time for each particular conduit. This system operates as follows:

a) valve 4 is closed and valve 6 is opened, subsequently any powder residing in the withdrawal conduit (3) is conveyed back into the reactor or maintained in a fluidisation state preventing formation of a solid lump;

b) valve 7 is closed and valve 10 is opened and any powder or blockages in the 'uplift' conduit is conveyed into the degassing chamber.

There are numerous factors controlling the cycle time of the 'uplift' system':

As expected the higher the initial quantity of gas in respect to powder or the lower the withdrawal bulk density (solid/gas ratio) the shorter and the easier the conveying time for withdrawal from the reactor to the hopper. However the higher the withdrawal bulk density the smaller the quantity of gas to recycle and therefore the smaller the size of the recycle gas compressor required. It is therefore essential to find the correct balance between gas and powder. Typically, the solid/gas ratio (kg PE/kg gas) is less than 15 kg/kg, preferably less than 12 kg/kg, and most preferably less than 10 kg/kg.

The volume of the gas lock hopper used shows minimal effect in relation to global reactor withdrawal capacity, however the higher the capacity of the lock hopper, the longer the conveying time for the transfer of the total quantity of powder it contains. As noted previously, the internal volume of the recovery gas lock hopper is usually below 1000 LITERS, preferably below 550 LITERS.

The pressure of the gas lock hopper is a significant factor in respect to conveying time, as expected the higher the pressure the faster the powder is conveyed. The pressure in the lock hopper immediately prior to transport of polymer through the uplift conduit is usually at least 10 bar, preferably at least 15 bar, and most preferably at least 20 bar. Similarly, the pressure differential between the lock hopper and the degasser is typically at least 9 bar, preferably at least 15 bar, and most preferably at least 20 bar.

The degasser (degassing chamber) is preferably a combined degassing chamber in which both pressure let down and polymer stripping with gas occur. In one configuration, a first degasser is provided on top of a second degasser. The polymer is first passed to the top of the first degasser, wherein partial degassing occurs, and subsequently the polymer passes, under the influence of gravity, in to the second degasser below, wherein further degassing occurs usually by gas stripping. The uplift pipe allows the first degasser to be located above the second degasser without the need of a conveying system between the first and the second degasser.

The present invention also provides a process for the continuous gas-phase polymerization of olefin(s), which process comprises using the equipment as defined herein. In particular, the present invention also provides a process for the continuous gas-phase polymerization of olefin(s), which process comprises a) polymerising one or more olefin monomers in a reactor in the presence of a polymerization catalyst in a fluidized or mechanically stirred bed, said reactor having a vertical side wall, and being provided at its base with a fluidization grid, the vertical side wall of the reactor extending a height H above the fluidization grid, said polymerization also comprising removing a reaction gas mixture from the top of the reactor, compressing and removing heat therefrom and recycling the mixture to the base of the reactor under the fluidization grid, and controlling the level of the fluidised or mechanically stirred bed by a bed level controller, b) withdrawing polymer through at least one withdrawal conduit which leaves the side wall of the reactor at a height of the reactor wall above the fluidization grid ranging from 0 H to 0.15 H, whilst being directed in a downwards fashion at an angle A with the horizontal plane ranging from 20 to 75 degrees below the horizontal plane, and said withdrawal conduit having an internal diameter of between 5.0 and 20.5 cm, c) passing the polymer to the at least one recovery gas lock hopper equipped with a discharge valve and which has a volume of at least 200 liters, and d) subsequently passing the polymer via at least one uplift conduit which has a vertical height of at least 20 m and an internal diameter of between 5.0 and 20.5 cm, to the inlet of at least one degassing chamber.

The process for continuous gas-phase polymerization of olefin(s) is carried out in a reactor with a fluidized and optionally mechanically stirred bed, typically maintained at an absolute pressure $P_1$ which may range from 0.5 to 6 MPa (5 to 60 bar), preferably from 1 to 4 MPa (10 to 40 bar). The temperature of the fluidized bed may be maintained at a value ranging from 30 to 130° C., preferably from 50 to 110° C. A reaction gas mixture passes through the reactor at an upward velocity which may range from 0.3 to 0.8 m/s, preferably 0.4 to 0.7 m/s. The reaction gas mixture contains one or more olefins, especially $C_2$ to $C_{10}$, preferably $C_2$ to $C_8$, for example ethylene or propylene, or a mixture of ethylene with at least one $C_3$ to $C_{10}$, preferably $C_3$ to $C_8$, olefin, for example propylene, 1-butene, 1-hexene, 4-methyl-1-pentene or 1-octene, and/or also with at least one diene, for example an unconjugated diene. It may also contain hydrogen and/or an inert gas such as nitrogen or, for example, a $C_1$ to $C_6$, preferably $C_2$ to $C_5$, alkane.

The polymerization process may in particular be carried out according to the process described in WO 94/28032.

The polymerization process may be carried out in the presence of a catalyst comprising at least one transition metal belonging to groups 4, 5 or 6 of the Periodic Classification of the elements (as approved by the Nomenclature Committee of the "American Chemical Society", see "Encyclopedia of Inorganic Chemistry", editor R. Bruce King, published by John Wiley & Sons (1994)). In particular, it is possible to employ a catalyst system of the Ziegler-Natta type including a solid catalyst comprising a compound of a transition metal such as those mentioned above and a cocatalyst comprising an organometallic compound of a metal belonging to groups 1, 2 or 3 of the Periodic Classification of the elements, for example an organoaluminium compound. High-activity catalyst systems have already been known for a number of years and are capable of producing large quantities of polymer in a relatively short time, with the result that it is possible to avoid the stage of removal of the catalyst residues present in the polymer. These high-activity catalyst systems generally include a solid catalyst essentially comprising transition metal, magnesium and halogen atoms. It is also possible to employ a high-activity catalyst comprising essentially a chromium oxide activated by a heat treatment and used in combination with a granular support based on a refractory oxide. The polymerization process is very particularly suitable for being employed with metallocene catalysts such as zirconocene, hafnocene, titanocene or chromocene, or Ziegler catalysts supported on silica for example based on titanium or vanadium. The abovementioned catalysts or catalyst systems may be employed directly as they are in the fluidized-bed reactor or may be converted beforehand into olefin prepolymer, in particular during a prepolymerization bringing the catalyst or catalyst system into contact with one or more olefins such as those mentioned above, in a hydrocarbon liquid medium or in gaseous phase.

The process is very particularly suitable for manufacturing polyolefins in powder form, in particular linear high or low density polyethylene of relative density ranging, for example, from 0.87 to 0.97, or polypropylene or copolymers of propylene with ethylene and/or $C_4$ to $C_8$ olefins or elastomeric copolymers of propylene with ethylene and optionally at least one unconjugated diene with a relative density ranging, for example, from 0.85 to 0.87.

The fluidized bed may occupy the whole of the reactor with a vertical side wall and which rises to a height H starting from the fluidization grid. In practice the fluidized bed generally occupies only a portion of the fluidized-bed reactor, with the result that the height of the fluidized bed, h, is equal to 0.95× H, preferably 0.90×H and in particular 0.85×H, thus avoiding excessive entrainments of polymer particles out of the top of the reactor.

The invention claimed is:

1. Equipment for the gas-phase polymerization of olefin(s), comprising:
   a reactor with a fluidized or mechanically stirred bed and with a vertical side wall, provided at its base with a fluidization grid, the vertical side wall of the reactor extending a height H above the fluidization grid,
   a conduit for external circulation of a reaction gas mixture, connecting the top of the reactor to the base of the reactor under the fluidization grid and including a compressor and at least one piece of equipment for heat removal,
   a bed level controller,
   at least one withdrawal conduit for withdrawing polymer,
   at least one uplift conduit,
   at least one recovery gas lock hopper equipped with a discharge valve, and
   at least one degassing chamber, wherein
   (i) the at least one withdrawal conduit connects the reactor to the at least one recovery gas lock hopper, the at least one withdrawal conduit has an isolation valve prior to the recovery gas lock hopper and the at least one withdrawal conduit leaves the side wall of the reactor at a height of the reactor wall above the fluidization grid ranging from 0 H to 0.15 H, whilst being directed in a downwards fashion at an angle A with the horizontal plane ranging from 20 to 75 degrees below the horizontal plane, and said withdrawal conduit having an internal diameter of between 5.0 and 20.5 cm,
   (ii) the recovery gas lock hopper has a volume of at least 200 liters,
   (iii) the at least one uplift conduit is connected between the recovery gas lock hopper and an inlet of the degassing chamber and has a vertical height of at least 20 m and an internal diameter of between 5.0 and 20.5 cm, and provides transport in an upwards direction in the direction of flow between the reactor and the inlet of the degassing chamber,
   (iv) the inlet of the at least one degassing chamber is disposed at a vertical height above the vertical height at which the withdrawal conduit leaves the side wall of the reactor, and
   (v) at least one means is provided for flushing the at least one uplift conduit.

2. Equipment according to claim 1 wherein the bed level controller resets the withdrawal rate for the withdrawal conduit in order to maintain the reactor bed level at a constant height.

3. Equipment according to claim 1 wherein the withdrawal conduits have an internal diameter above 6.0 cm and below 10.5 cm.

4. Equipment according to claim 3 wherein the withdrawal conduits have an internal diameter above 6.0 cm and below 8 cm.

5. Equipment according to claim 1 further comprising at least two withdrawal conduits exiting the reactor and subsequently at least two gas lock hoppers.

6. Equipment according to claim 5 wherein the at least two gas lock hoppers are interconnected by a pressure equalizer conduit which is equipped with an interconnection valve.

7. Equipment according to claim 1 further comprising a delumper in at least one of the polymer withdrawal conduits.

8. Process for the polymerisation of olefins, which process comprises providing an equipment according to claim 1, and a) polymerising one or more olefin monomers in said reactor of said equipment in the presence of a polymerization catalyst in a fluidized or mechanically stirred bed, said polymerization also comprising removing a reaction gas mixture from the top of the reactor, compressing and removing heat therefrom and recycling the mixture to the base of the reactor under the fluidization grid, and controlling the level of the fluidised or mechanically stirred bed by a bed level controller, b) withdrawing polymer through said at least one withdrawal conduit, and passing the polymer to said at least one recovery gas lock hopper equipped with a discharge valve and which has a volume of at least 200 liters, and c) subsequently passing the polymer via said at least one uplift conduit to said inlet of said at least one degassing chamber.

* * * * *